United States Patent
Kamiguchi et al.

(10) Patent No.: US 10,839,357 B2
(45) Date of Patent: Nov. 17, 2020

(54) VISUAL GUIDANCE DEVICE, VISUAL GUIDANCE SYSTEM AND VISUAL GUIDANCE METHOD

(71) Applicant: FANUC CORPORATION, Yamanashi (JP)

(72) Inventors: Masao Kamiguchi, Yamanashi (JP); Shouichi Kawakami, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 135 days.

(21) Appl. No.: 16/291,118

(22) Filed: Mar. 4, 2019

(65) Prior Publication Data
US 2019/0303883 A1    Oct. 3, 2019

(30) Foreign Application Priority Data
Apr. 2, 2018    (JP) .................................. 2018-071031

(51) Int. Cl.
*G06Q 10/00* (2012.01)
*G09B 5/12* (2006.01)
*G06K 9/00* (2006.01)

(52) U.S. Cl.
CPC .......... *G06Q 10/20* (2013.01); *G06K 9/00671* (2013.01); *G09B 5/125* (2013.01)

(58) Field of Classification Search
CPC .... G06K 9/00671; G06Q 10/20; G09B 5/125; H04N 7/18; H04N 5/2628
USPC ....................................................... 382/173
See application file for complete search history.

(56) References Cited

U.S. PATENT DOCUMENTS

| | | | | |
|---|---|---|---|---|
| 6,138,056 A | * | 10/2000 | Hardesty | G05B 19/4063 700/174 |
| 9,495,783 B1 | * | 11/2016 | Samarasekera | G06K 9/2054 |
| 2007/0073306 A1 | * | 3/2007 | Lakin | A61B 17/155 606/87 |

(Continued)

FOREIGN PATENT DOCUMENTS

| | | |
|---|---|---|
| JP | 10-222726 | 8/1998 |
| JP | 11-41388 | 2/1999 |

(Continued)

OTHER PUBLICATIONS

Notification of Reasons for Refusal dated Mar. 17, 2020 in Japanese Patent Application No. 2018-071031.

*Primary Examiner* — Ali Bayat
(74) *Attorney, Agent, or Firm* — Wenderoth, Lind & Ponack, L.L.P.

(57) ABSTRACT

A visual guidance device including: an image data acquisition unit which acquires image data when a machine is seen from a predetermined position and image data when the machine is seen from a different position from the predetermined position; an image conversion unit which produces image data by converting, with one or more aspect ratios, the image data when the machine is imaged from the predetermined position; and a guidance display control unit which sequentially displays, on a display unit, the image data when the machine is imaged from the predetermined position, the image data produced by the image conversion unit and the image data when the machine is imaged from the different position so as to guide a movement from the predetermined position to the different position.

11 Claims, 13 Drawing Sheets

(56) References Cited

U.S. PATENT DOCUMENTS

| | | | | |
|---|---|---|---|---|
| 2012/0157841 A1* | 6/2012 | Glaenzer | ............... | A61B 8/445 |
| | | | | 600/439 |
| 2018/0228568 A1* | 8/2018 | Kato | ...................... | A61B 90/11 |
| 2018/0315329 A1* | 11/2018 | D'Amato | ................. | G06N 3/08 |
| 2019/0218753 A1* | 7/2019 | Morimoto | ................. | E02F 3/34 |

FOREIGN PATENT DOCUMENTS

| | | |
|---|---|---|
| JP | 2001-137757 | 5/2001 |
| JP | 2003-295915 | 10/2003 |
| JP | 2017-068324 | 4/2017 |

\* cited by examiner

FIG. 3A

|  | HOME | POSITION1 | POSITION2 | POSITION3 |
|---|---|---|---|---|
| UNIT01 | FRONT SURFACE | RIGHT SIDE SURFACE |  | R1 |
| UNIT02 | FRONT SURFACE | LEFT SIDE SURFACE |  | L1 |
| UNIT03 | FRONT SURFACE | BACK SURFACE |  | BI1 |
| UNIT04 | FRONT SURFACE | BACK SURFACE | BACK SURFACE BOX | BB1 |
| UNIT05 | FRONT SURFACE | BACK SURFACE | BACK SURFACE BOX | BB2 |
| ... | ... | ... | ... | ... |

141: POSITION ORDER TABLE

FIG. 3B

| FRONT SURFACE | FRONT SURFACE IMAGE |
|---|---|
| RIGHT SIDE SURFACE | RIGHT SIDE SURFACE IMAGE |
| LEFT SIDE SURFACE | LEFT SIDE SURFACE IMAGE |
| BACK SURFACE | BACK SURFACE IMAGE |
| BACK SURFACE BOX | BACK SURFACE BOX IMAGE |
| R1 | R1 IMAGE |
| L1 | L1 IMAGE |
| ... | ... |

142: POSITION IMAGE CORRESPONDENCE TABLE

FIG. 3C

| AL(1) | UNIT03 |
|---|---|
| AL(2) | UNIT01 |
| AL(3) | UNIT05 |
| AL(4) | UNIT04 |
| AL(5) | UNIT02 |
| ... | ... |

143: ALARM PART CORRESPONDENCE TABLE

FRONT SURFACE IMAGE

RIGHT SIDE SURFACE IMAGE

LEFT SIDE SURFACE IMAGE

BACK SURFACE IMAGE

BACK SURFACE BOX IMAGE

R1 IMAGE

L1

L1 IMAGE

BI1

BI1 IMAGE

BB1 TO BB5 IMAGES

FIG. 5A
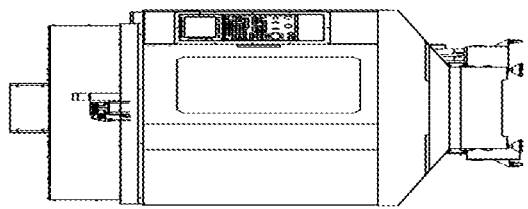
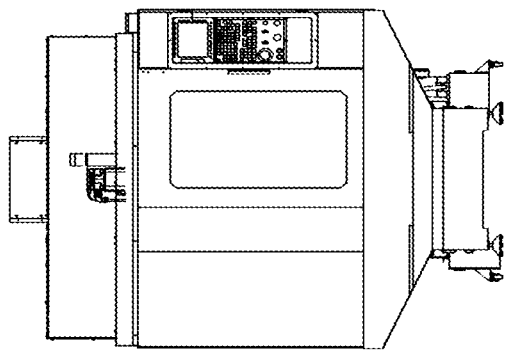
CHANGE OF ASPECT RATIOS OF LEFT AND RIGHT SIDES OF FRONT SURFACE IMAGE
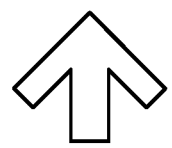
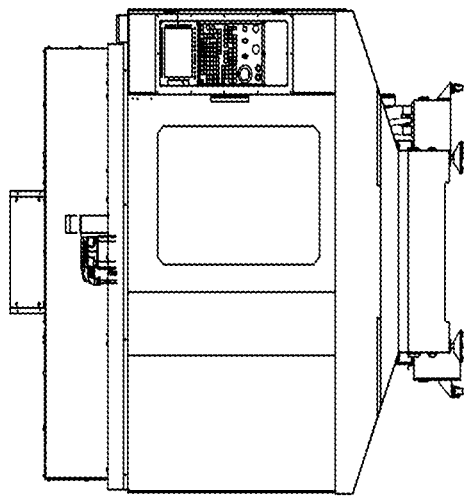
FRONT SURFACE IMAGE

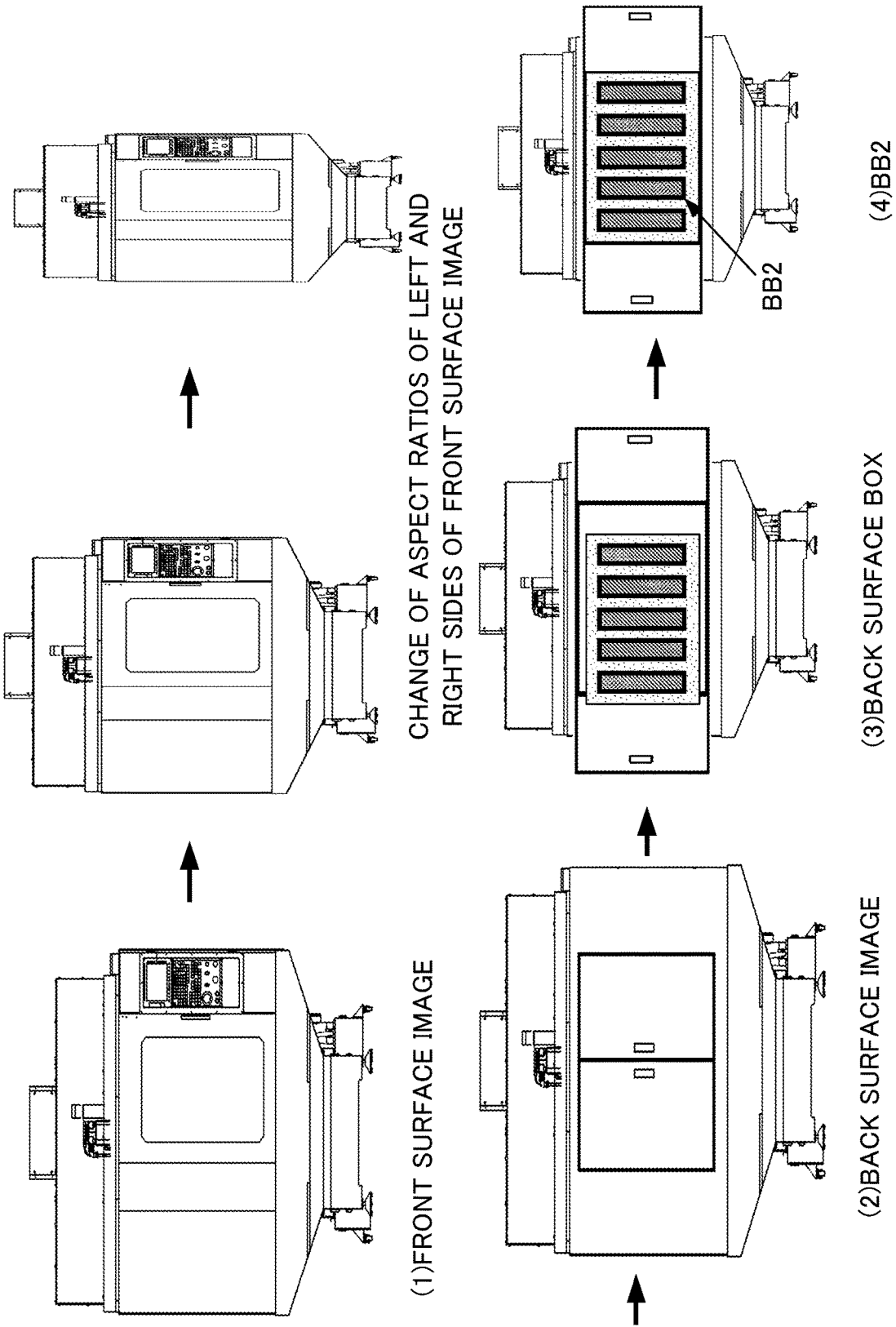

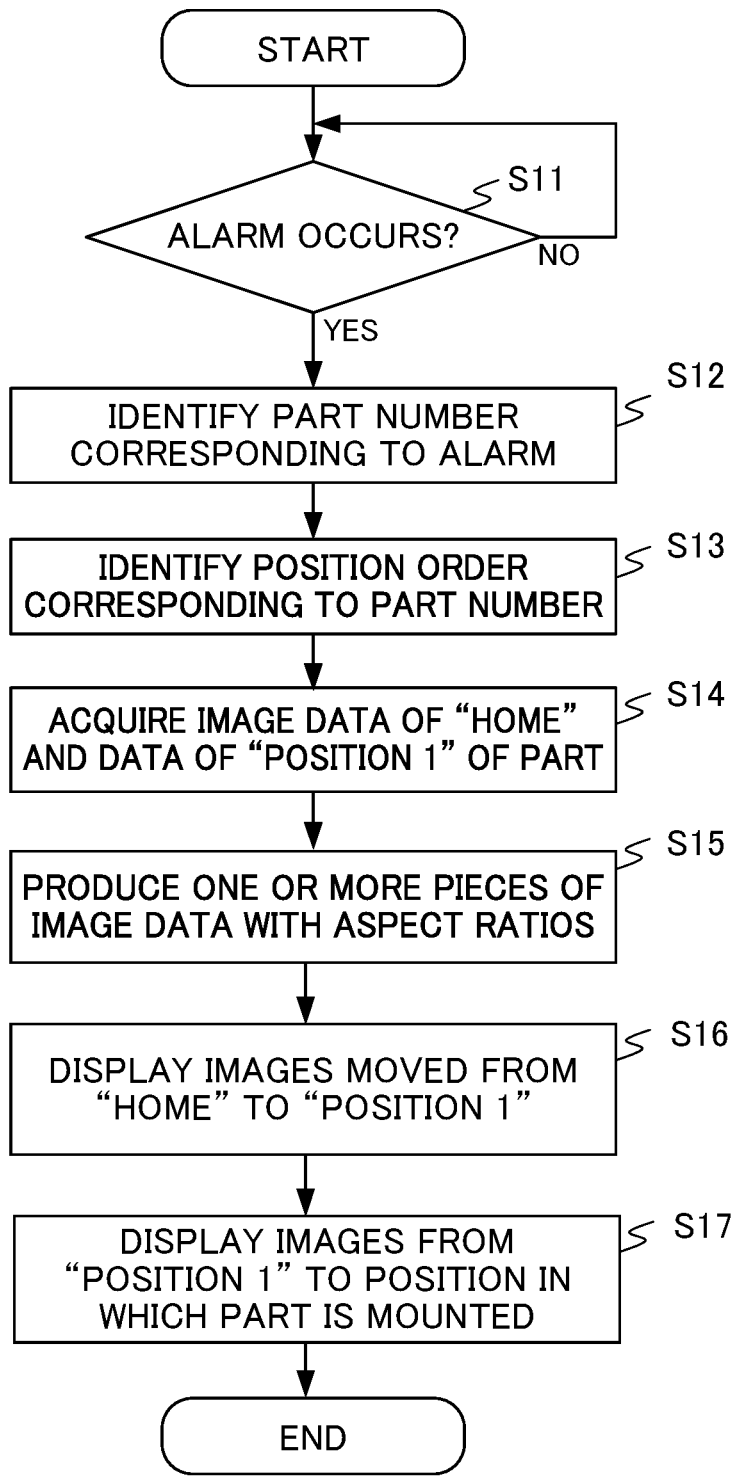

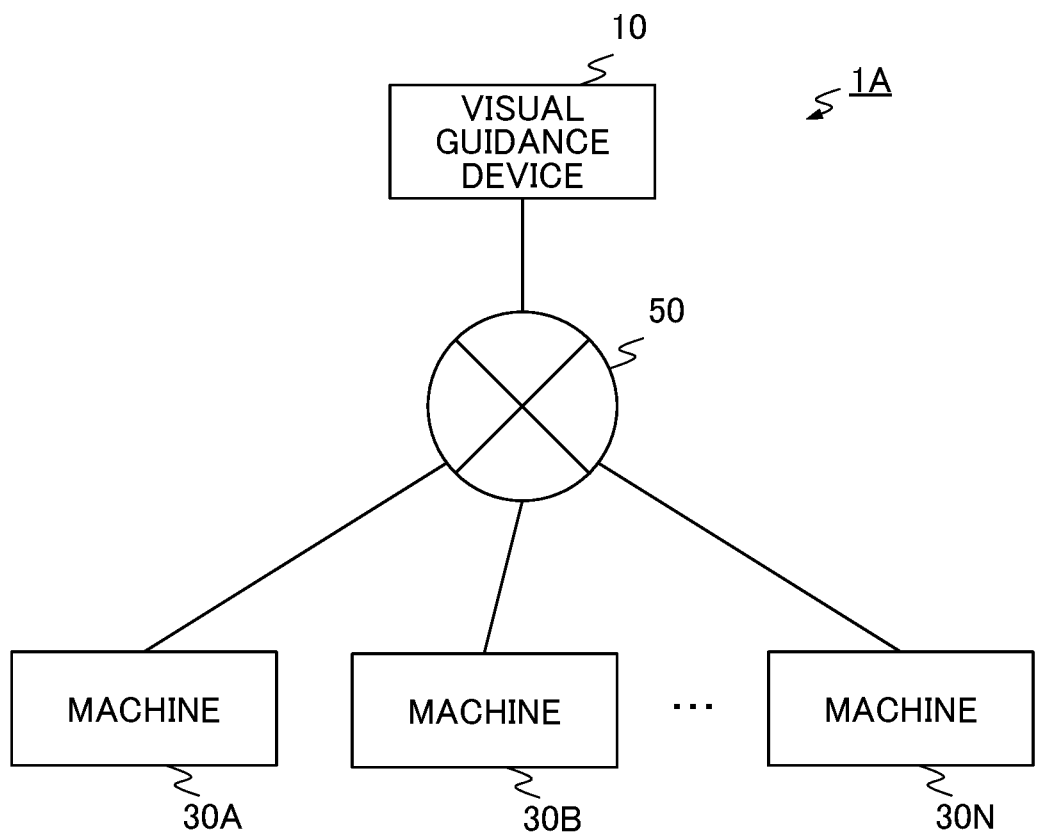

VISUAL GUIDANCE DEVICE, VISUAL GUIDANCE SYSTEM AND VISUAL GUIDANCE METHOD

This application is based on and claims the benefit of priority from Japanese Patent Application No. 2018-071031, filed on 2 Apr. 2018, the content of which is incorporated herein by reference.

BACKGROUND OF THE INVENTION

Field of the Invention

The present invention relates to a visual guidance device, a visual guidance system and a visual guidance method in which based on image data when a machine is sees from a predetermined position and image data when the machine is seen from a separate position different from the predetermined position, a dynamic image is generated according to the direction of a movement from the predetermined position to the separate position different from the predetermined position and is displayed on a display device, and in which thus the movement from the predetermined position to the separate position different from the predetermined position is guided.

Related Art

Conventionally, even when in a machine whose structure is complicated, an alarm occurs such that a faulty part is identified, it is difficult to identify a position in which the faulty part is mounted.
In this respect, patent document 1 discloses a technology in which in order for the faulty portion of an automobile to be identified, a drawing of the same vehicle as the vehicle possessed by a user is displayed, and in which the faulty portion is identified while guidance is being utilized. Patent document 2 discloses a technology in which, for example, when a failure occurs in a facsimile machine, a failure code is notified to a PC, and in which thus in the PC, based on the failure code notified from the facsimile machine, a video file that corresponds to the failure code and that is previously stored is executed such that a video operation guidance for guiding an operation of repairing the failure is displayed.
Patent Document 1: Japanese Unexamined Patent Application, Publication No. 2001-137757
Patent Document 2: Japanese Unexamined Patent Application, Publication No. H11-041388

SUMMARY OF THE INVENTION

In the drawing cited in the technology according to cited reference 1, a description is given of an internal structure which is naturally known by a person who generally drives an automobile.
However, the structure is significantly changed depending on the manufacturer, and in the case of a machine such as a machine tool whose structure is complicated, an operator who actually operates it is familiar with the place of the machine which is normally operated but is often unfamiliar with the structures of the side surfaces and the back surface of the machine.
Hence, even if the faulty part or a unit including the faulty part is identified, when the part or the unit is present in the side surface or the back surface, it is disadvantageously difficult to grasp a position in which the part or the unit is mounted.

In the technology according to patent document 2, for example, in order to provide guidance with a dynamic illustration from a certain specific place to the place of occurrence of a failure, it is necessary to previously produce a video file from the specific place to the place of occurrence of the failure.
In this method, special equipment and facilities for the production of the video file and furthermore, time are disadvantageously needed.

The present invention is made in view of the foregoing problems, and an object of the present invention is to provide a visual guidance device, a visual guidance system and a visual guidance method in which based on image data when a machine is seen from a predetermined position and image data when the machine is seen from a separate position different from the predetermined position, a dynamic image is generated according to the direction of a movement from the predetermined position to the separate position different from the predetermined position and is displayed on a display device, and in which thus the movement from the predetermined position to the separate position different from the predetermined position is guided.

(1) According to the present invention, a visual guidance device (for example, a "visual guidance device 10" which will be described later) is provided. The visual guidance device includes a control unit (for example, a "control unit 11" which will be described later), and the control unit includes: an image data acquisition unit (for example, an "image data acquisition unit 111" which will be described later) which acquires image data when a machine (for example, a "machine 30" which will be described later) is seen from a predetermined position and image data when the machine is seen from a separate position different from the predetermined position; an image conversion unit (for example, an "image conversion unit 112" which will be described later) which produces one or more pieces of image data by converting, with one or more aspect ratios, the image data when the machine is seen from the predetermined position that is acquired by the image data acquisition unit; and a guidance display control unit (for example, a "guidance display control unit 113" which will be described later) which sequentially displays, on a display device (for example, a "display unit 20" which will be described later), the image data when the machine is seen from the predetermined position, the one or more pieces of image data produced by the image conversion unit and the image data when the machine is seen from the separate position different from the predetermined position so as to guide a movement from the predetermined position to the separate position different from the predetermined position.

(2) Preferably, in the visual guidance device (for example, a "visual guidance device 10" which will be described later) described in (1), the image data when the machine is seen from the separate position different from the predetermined position includes, for each of parts of the machine, image data indicating a position in which the part is mounted, and the guidance display control unit (for example, a "guidance display control unit 113" which will be described later) sequentially displays, on the display device (for example, a "display unit 20" which will be described later, the image data when the machine is seen from the predetermined position, the one or more pieces of image data produced by the image conversion unit (for example, an "image conversion unit 112" which will be described later) and the image data indicating the position in which the part is mounted so as to guide a movement from the predetermined position to the position in which the part is mounted.

(3) Preferably, in the visual guidance device (for example, a "visual guidance device 10" which will be described later) described in (2), when the machine outputs an alarm, the guidance display control unit (for example, a "guidance display control unit 113" which will be described later) further sequentially displays, on the display device (for example, a "display unit 20" which will be described late), based on a correspondence relationship between the alarm and the part, the image data when the machine is seen from the predetermined position, the one or more pieces of image data produced by the image conversion unit (for example, an "image conversion unit 112" which will be described later) and image data indicating a position in which the part corresponding to the alarm is mounted so as to guide a movement from the predetermined position to the position in which the part corresponding to the alarm is mounted.

(4) Preferably, in the visual guidance device (for example, a "visual guidance device 10" which will be described later) described in (3), when the guidance display control unit (for example, a "guidance display control unit 113" which will be described later) sequentially displays the image data when the machine is seen from the predetermined position, the one or more pieces of image data produced by the image conversion unit and the image data indicating the position in which the part corresponding to the alarm is mounted, the guidance display control unit performs the display with a comment on the display device (for example, a "display unit 20" which will be described later).

(5) Preferably, in the visual guidance device (for example, a "visual guidance device 10" which will be described later) described in (3) or (4), when the guidance display control unit (for example, a "guidance display control unit 113" which will be described later) sequentially displays the image data when the machine is seen from the predetermined position, the one or more pieces of image data produced by the image conversion unit and the image data indicating the position in which the part corresponding to the alarm is mounted, the guidance display control unit performs the display with a sound on the display device (for example, a "display unit 20" which will be described later).

(6) Preferably, in the visual guidance device (for example, a "visual guidance device 10" which will be described later) described in any one of (1) to (5), the image data when the machine is seen from the predetermined position is an outline view when the machine is seen from a point at which an operation panel of the machine is seen.

(7) Preferably, in the visual guidance device (for example, a "visual guidance device 10" which will be described later) described in any one of (1) to (6), the image data acquisition unit (for example, an "image data acquisition unit 111" which will be described later) acquires the image data from a storage device (for example, a "storage unit 14" which will be described later) which stores the image data.

(8) Preferably, in the visual guidance device (for example, a "visual guidance device 10" which will be described later) described in any one of (1) to (7), the guidance display control unit (for example, a "guidance display control unit 113" which will be described later) is connected so as to be able to perform communication.

(9) According to the present invention, a machine (for example, a "machine 30" which will be described later) is provided which includes the visual guidance device (for example, a "visual guidance device 10" which will be described later) described in any one of (1) to (8).

(10) According to the present invention, a visual guidance system (for example, a "visual guidance system 1" which will be described later) is provided which includes one or more of the machines (for example, a "machine 30" which will be described later) which are connected to the visual guidance device (for example, a "visual guidance device 10" which will be described later) described in any one of (1) to (8) so as to be able to communicate therewith.

(11) According to the present invention, a visual guidance method using one or more computers is provided. The visual guidance method includes: an image data acquisition step of acquiring image data when a machine (for example, a "machine 30" which will be described later) is seen from a predetermined position and image data when the machine is seen from a separate position different from the predetermined position; an image conversion step of producing one or more pieces of image data by converting, according to the direction of a rotational movement with one or more aspect ratios, the image data when the machine is seen from the predetermined position that is acquired by the image data acquisition step; and a guidance display control step of sequentially displaying, on a display device (for example, a "display unit 20" which will be described later), the image data when the machine is seen from the predetermined position, the one or more pieces of image data produced by the image conversion step and the image data when the machine is seen from the separate position different from the predetermined position so as to guide a movement from the predetermined position to the separate position different from the predetermined position.

According to the present invention, it is possible to provide a visual guidance device, a visual guidance system and a visual guidance method in which it is not necessary to previously produce continuous display drawings or a video file, in which based on image data when a machine is seen from a predetermined position and image data when the machine is seen from a separate position different from the predetermined position, a dynamic image is generated according to the direction of a movement from the predetermined position to the separate position different from the predetermined position and is displayed on a display device and in which thus the movement from the predetermined position to the separate position different from the predetermined position is guided.

BRIEF DESCRIPTION OF THE DRAWINGS

FIG. 3A is an example of a position order table included in position order data in the first embodiment of the present invention;

FIG. 3B is an example of a position image correspondence table which indicates a correspondence relationship between position information and image data in the first embodiment of the present invention;

FIG. 3C is an example of an alarm part correspondence table which indicates a correspondence relationship between alarms and parts in the first embodiment of the present invention;

FIG. 5A is an example of image data generated by converting the front surface image with one or more aspect ratios by the visual guidance device according to the first embodiment of the present invention;

FIG. 5B is an example of a screen transition in guidance performed by the visual guidance device according to the first embodiment of the present invention;

FIG. 6 is a flowchart showing the operation of the visual guidance device according to the first embodiment of the present invention;

FIG. 8 is an overall configuration view of a visual guidance system according to a third embodiment of the present invention.

DETAILED DESCRIPTION OF THE INVENTION

First Embodiment

Figure 1:
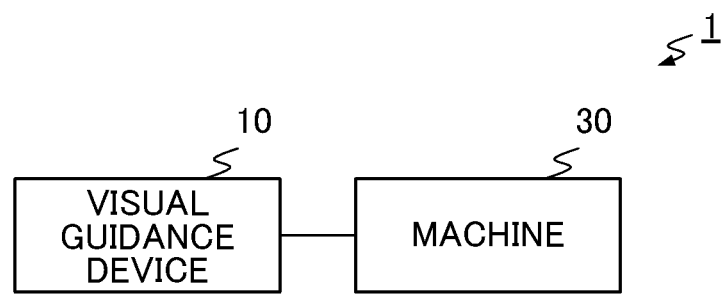
FIG. 1 is an overall configuration view of a visual guidance system according to a first embodiment of the present invention.

A first embodiment of the present invention will be described in detail below with reference to FIGS. 1 to 6. FIG. 1 is an overall configuration view of a visual guidance system 1 according to the present invention.

The visual guidance system 1 includes, for example, a visual guidance device 10 and a machine 30.

The visual guidance device 10 and the machine 30 are formed as a one-to-one group, and are connected so as to be able to communicate with each other.

The visual guidance device 10 and the machine 30 may be directly connected through a connection interface or may be connected through a network such as a LAN (Local Area Network).

The visual guidance device 10 is a device that produces one or more pieces of image data by converting image data when the machine 30 is seen from a predetermined position according to the direction of the rotational movement with one or more aspect ratios, and that sequentially displays the image data when the machine 30 is seen from the predetermined position, the one or more pieces of image data obtained by the conversion with the one or more aspect ratios and image data indicating a position in which a part of the machine 30 is mounted so as to perform dynamical guidance from the predetermined position of the machine 30 to the position in which the part is mounted.

The machine 30 is a device such as an industrial robot or a machine tool which is installed within a factory. The machine 30 includes a computation processing device, a storage device, an input/output device by an operator and the like, and can be controlled by software.

Although in FIG. 1, the machine 30 is represented by one function block, the machine 30 may be a combination of a plurality of devices such as a combination of an industrial robot or a machine tool and a numerical controller for controlling it.

Examples of the machine tool include a lathe, a milling machine, an electric discharge machine, a grinding machine, a machining center and a laser processing machine.

Figure 2:
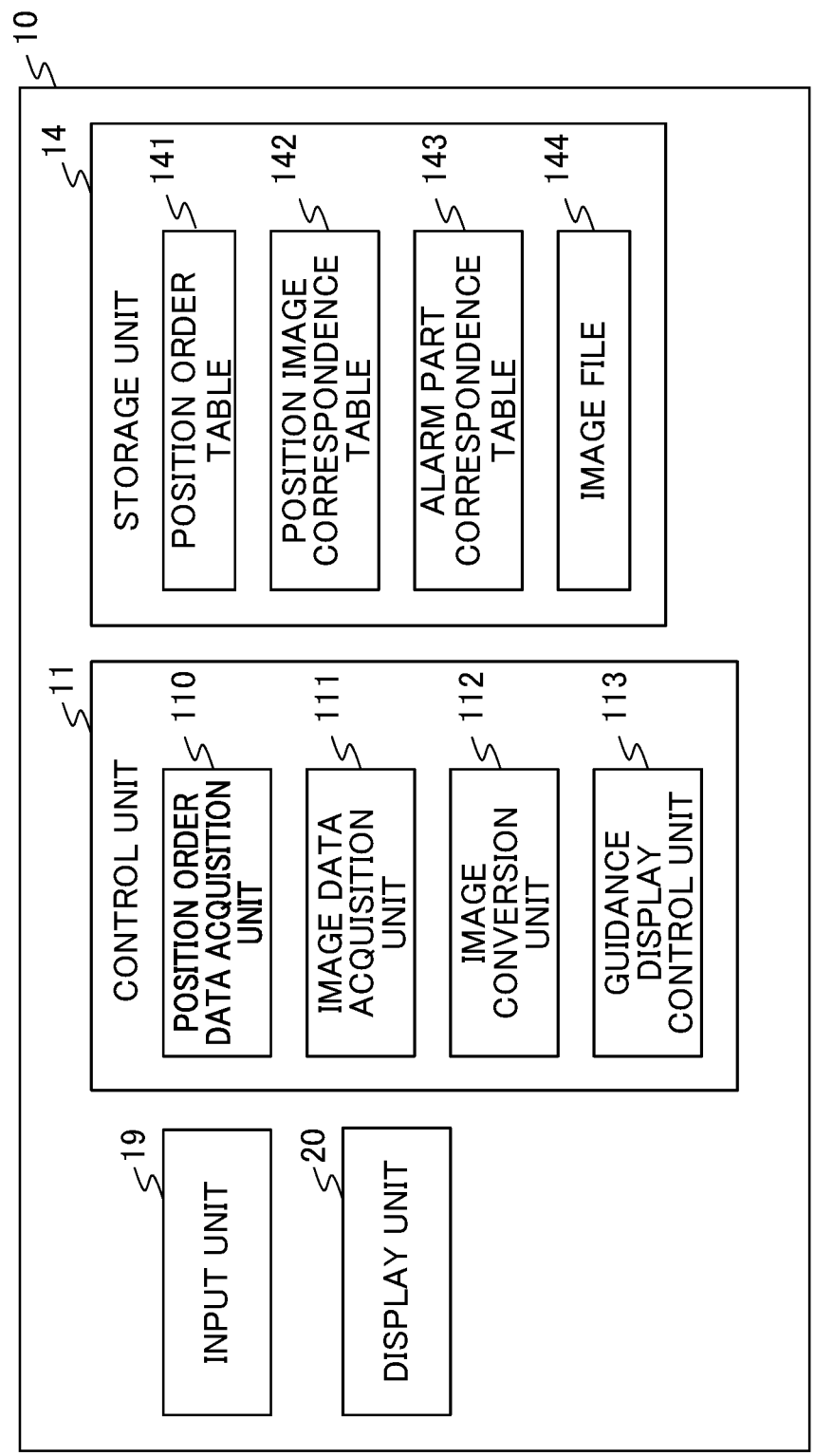
FIG. 2 is an overall configuration view of a visual guidance device according to the first embodiment of the present invention.

FIG. 2 is an overall configuration view of the visual guidance device 10.

The visual guidance device 10 includes a control unit 11, a storage unit 14, an input unit 19 and a display unit 20.

The control unit 11 is a unit which controls the entire visual guidance device 10, and reads various types of programs from a storage region such as a ROM, a RAM, a flash memory or a hard disk (HDD) as necessary and executes them so as to realize various types of functions in the present embodiment. The control unit 11 may be a CPU. The control unit 11 includes a position order data acquisition unit 110, an image data acquisition unit 111, an image conversion unit 112 and a guidance display control unit 113. The details of these functions will be described later.

In addition thereto, the control unit 11 includes general function blocks such as a function block for controlling the entire visual guidance device 10 and a function block for performing communication.

Since these general function blocks are well known by a person skilled in the art, the illustration and description thereof will be omitted.

The storage unit 14 stores, as position order data, a position order table 141, a position image correspondence table 142, an alarm part correspondence table 143 and an image file 144.

The tables and the details of the image file will be described in detail below with reference to FIGS. 3A to 3C and 4A to 4I.

FIG. 3A shows the position order table 141 that defines in what order of pieces of position information guidance is performed, for example, from a predetermined position that is a front surface when the machine is viewed from a point at which the operation panel of the machine is seen to positions in which the individual parts of the machine 30 are mounted. Specifically, the position order table 141 of FIG. 3A defines, for each of the parts (UNIT01 to UNIT05), the order in which the image of a "home" corresponding to the "predetermined position" described above is displayed and in which thereafter images indicating positions n are displayed from "position 1" to "position 2" and to "position 3" (mounted position) in this order.

For example, the data of a first row defines that when the position in which the part of "UNIT01" is mounted is displayed on the display unit 20 that will be described later, firstly, the image of a "front surface" is shown as the "home", secondly, the image of a "right side surface" is shown as the "position 1" and thirdly, the portion of "R1" in the image of the "right side surface" is shown as the "position 3" (the position in which the UNIT01 is mounted). For example, the data of a fourth row defines that when the position in which the part of "UNIT04" is mounted is displayed on the display unit 20, firstly, the image of the "front surface" is shown as the "home", secondly, the image of a "back surface" is shown as the "position 1", thirdly, the image of "back surface BOX" is shown as the "position 2" and fourthly, the image of "BB1" is shown as the "position 3" (the position in which the UNIT04 mounted).

FIG. 3B shows the position image correspondence table 142 that defines a correspondence relationship between the individual pieces of position information described in the position order table 141 of FIG. 3A and individual pieces of image data shown in FIGS. 4A to 4I which will be described later.

For example, in the data of the first row in the position image correspondence table 142 of FIG. 3B, it is defined that the position information of the "front surface" described in the position order table 141 of FIG. 3A corresponds to the image data of a "front surface image" shown in FIG. 4A which will be described later.

In the data of a second row in the position image correspondence table 142 of FIG. 3B, it is indicated that the positron information of the "right side surface" described in the position order table 141 of FIG. 3A corresponds to the image data of a "right side surface image" shown in FIG. 4B which will be described later.

In the data of a third row in the position image correspondence table 142 of FIG. 3B, it is indicated that the position information of the "left side surface" described in the position order table 141 of FIG. 3A corresponds to the image data of a "left side surface image" shown in FIG. 4C which will be described later.

In the data of a fourth row in the position image correspondence table 142 of FIG. 3B, it is defined that the position information of the "back surface" described in the position order table 141 of FIG. 3A corresponds to the image data of a "back surface image" shown in FIG. 4D which will be described later.

In the data of a fifth row in the position image correspondence table 142 of FIG. 3B, it is defined that the position information of the "back surface BOX" described in the position order table 141 of FIG. 3A corresponds to the image data of a "back surface BOX image" shown in FIG. 4F which will be described later.

In the data of a sixth row in the position image correspondence table 142 of FIG. 3B, it is indicated that the position information of the "R1" described in the position order table 141 of FIG. 3A corresponds to the image data of an "R1 image" shown in FIG. 4F which will be described later.

In the data of a seventh row in the position image correspondence table 142 of FIG. 3B, it is indicated that the position information of "L1" described in the position order table 141 of FIG. 3A corresponds to the image data of an "L1 image" shown in FIG. 4G which will be described later.

Although not shown in FIG. 3B, it is defined that the position information of "BB1" described in the position order table 141 of FIG. 3A corresponds to a "BB1 image" indicated by using an image of FIG. 4I which will be described later.

In the position order table 141, the fields of the "position 2" in the "UNIT01" to the "UNIT03" are blank, and this is because a symbol indicated in the "position 3" is included in the image corresponding to the "position 1". For example, in the case of the "UNIT01", it is defined that the field of the "position 3" indicates the "R1 image" shown in FIG. 4F which will be described later. As shown in FIG. 4F which will be described later, the "R1 image" is obtained by adding a symbol to the "right side surface image" (FIG. 4B which will be described later) corresponding to the "position 1", thus it is not necessary to define again the display of the "right side surface image" in the field of the "position 2" and hence, the field of the "position 2" is blank. The reason why the field of the "position 2" is blank in the "UNIT02" and the "UNIT03" is the same as described above.

FIG. 3C shows the alarm part correspondence table 143 which defines a correspondence relationship between individual alarms issued by the machine 30 and the part numbers of the parts of the machine 30.

For example, in the data of a first row in the alarm part correspondence table 143 of FIG. 3C, it is defined that the alarm of "AL (1)" corresponds to the part of the part number "UNIT03".

FIGS. 4A to 4I show examples of the pieces of image data corresponding to the pieces of position information included in the image file 144.

Figure 4A:
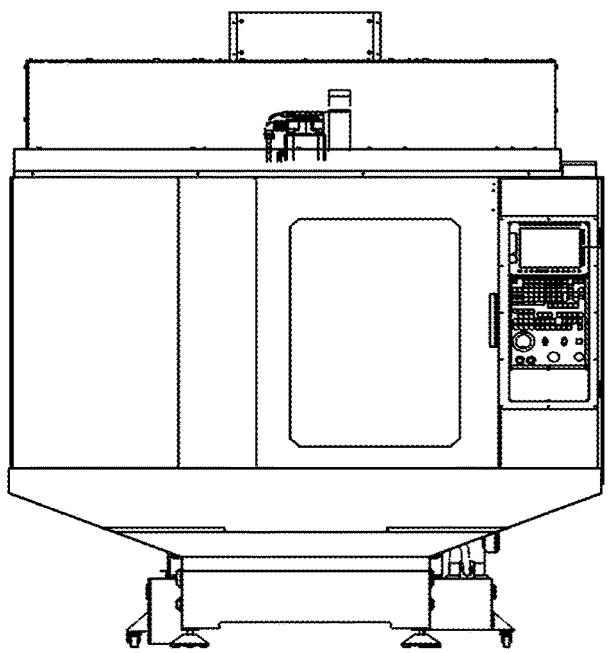
FIG. 4A is an example of a front surface image included in an image file in the first embodiment of the present invention.
Figure 4B:
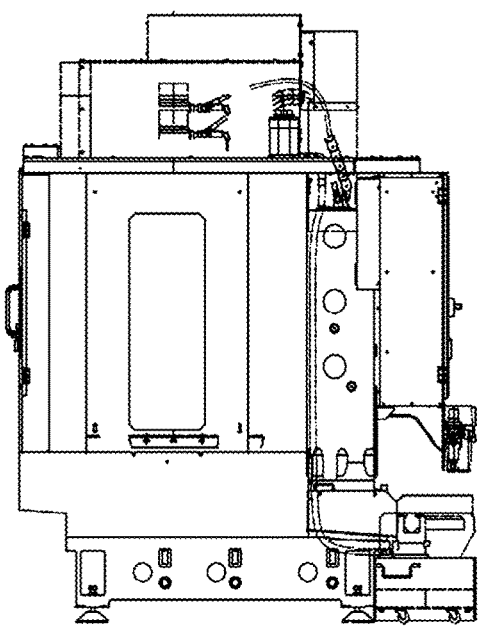
FIG. 4B is an example of a right side surface image included in the image file in the first embodiment of the present invention.
Figure 4C:
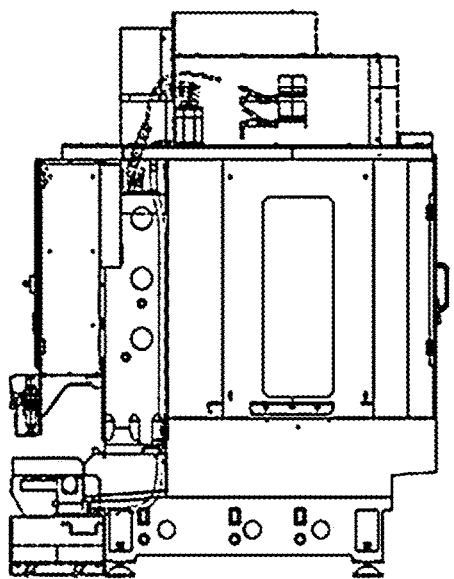
FIG. 4C is an example of a left side surface image included in the image file in the first embodiment of the present invention.
Figure 4D:
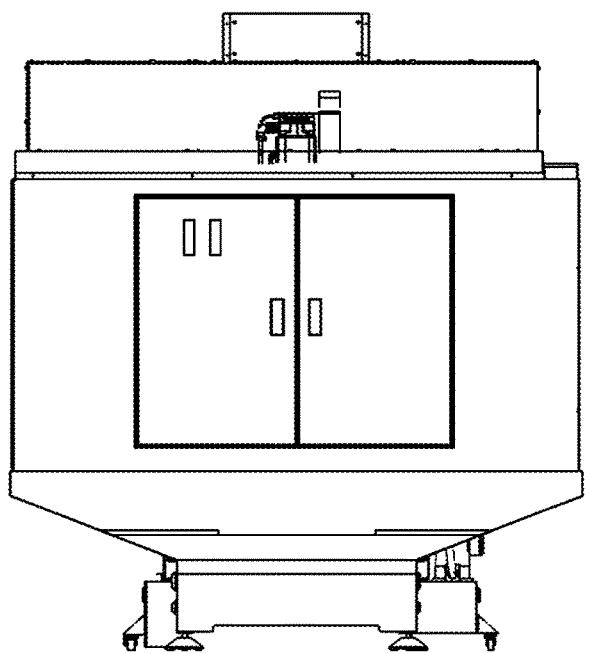
FIG. 4D is an example of a back surface image included in the image file in the first embodiment of the present invention.
Figure 4E:
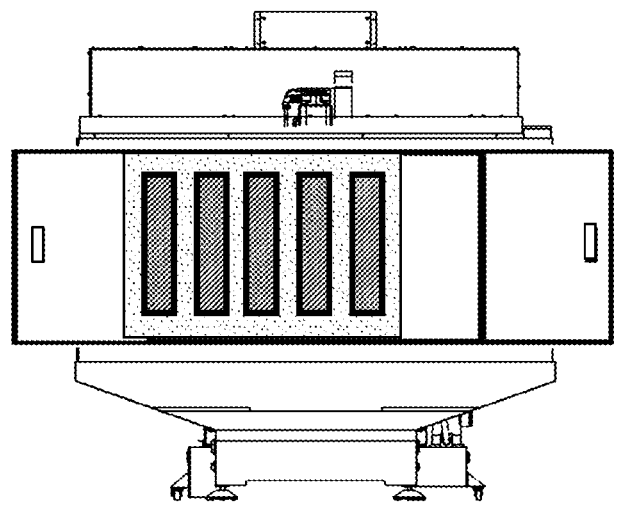
FIG. 4E is an example of a back surface BOX image included in the image file in the first embodiment of the present invention.
Figure 4F:
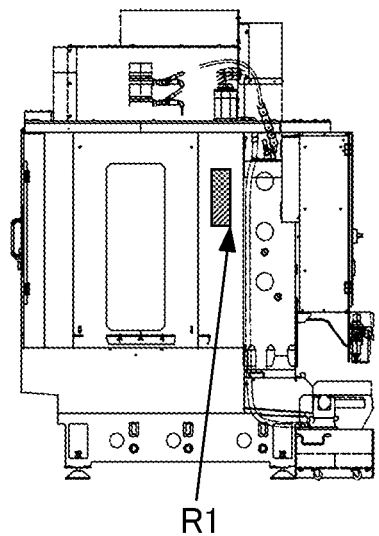
FIG. 4F is an example of an image indicating the position of "R1" included in the image file in the first embodiment of the present invention.
Figure 4G:
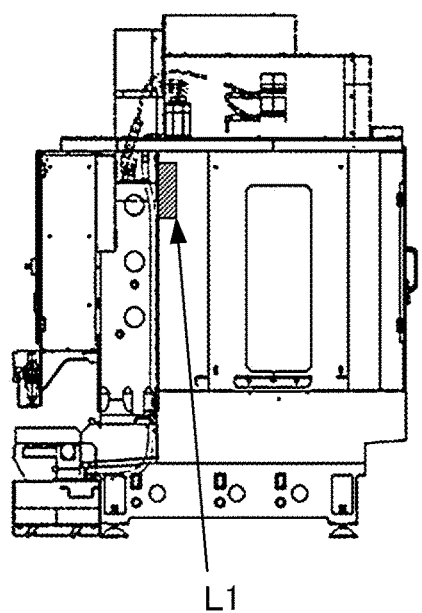
FIG. 4G is an example of an image indicating the position of "L1" included in the image file in the first embodiment of the present invention.
Figure 4H:
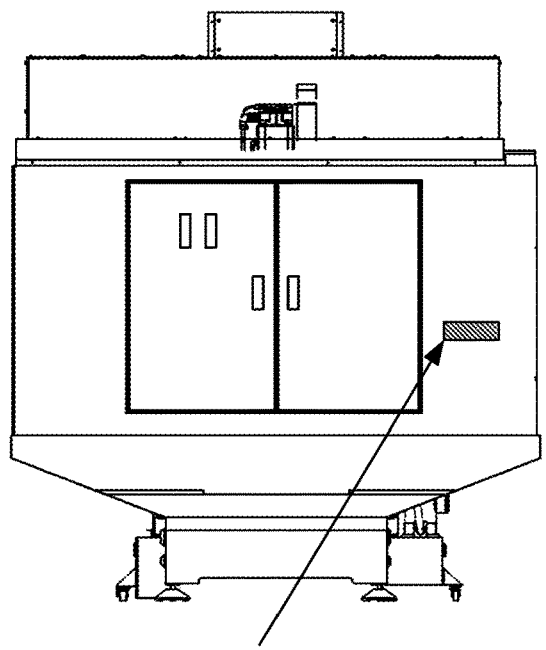
FIG. 4H is an example of an image indicating the position of "BI1" included in the image file in the first embodiment of the present invention.

FIG. 4A is the front surface image of the machine 30.
FIG. 4B is the right side surface image of the machine 30.
FIG. 4C is the left side surface image of the machine 30.
FIG. 4D is the back surface image of the machine 30.
FIG. 4E is the back surface BOX image showing individual boxes installed in the back surface of the machine 30.
FIG. 4F is an image showing the position of the "R1".
FIG. 4G is an image showing the position of the "L1".
FIG. 4H is an image showing the position of "BI1".
FIG. 4I is an image which collectively shows the symbols of the individual boxes indicated in the back surface BOX image. Specifically, FIG. 4I shows that the back surface boxes are indicated sequentially from the left side by the symbols of "BB1", "BB2", "BB3", "BB4" and "BB5".

Figure 4I:
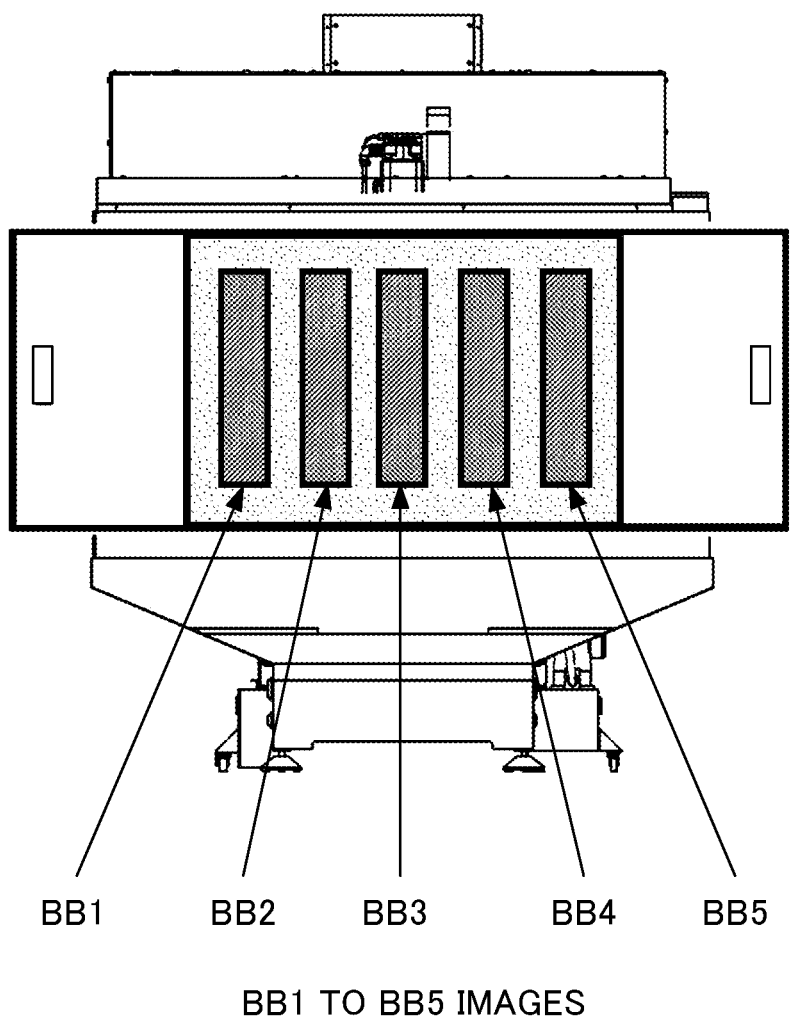
FIG. 4I is an example of an image indicating the positions of "BB1" to "BB5" included in the image file in the first embodiment of the present invention.

When the image of FIG. 4I is actually used, it is used as a "BB1 image" showing only the symbol "BB1", a "BB2 image" showing only the symbol "BB2", a "BB3 image" showing only the symbol "BB3", a "BB4 image" showing only the symbol "BB4" or a "BB5 image" showing only the symbol "BB5".

Among the individual pieces of image data, the image corresponding to the position information of the "home" in the position order table 141 of FIG. 3A is preferably an outline view when the machine 30 is seen from a point at which the operation panel of the machine 30 is seen.

The input unit 19 is a device which is used by the operator of the visual guidance device 10 in order to input the part numbers of the parts of the machine 30.

The display unit 20 is a device which is used in order to display images from the image indicating the predetermined position of the machine to the image indicating the position in which the part is mounted by control from the guidance display control unit 113.

The control unit 11 will then be described.

The position order data acquisition unit 110 references the position order table 141, the position image correspondence table 142, the alarm part correspondence table 143 and the image file 144 in order to obtain, for each of the parts of the machine 30, position order data in which one or more pieces of position information from the predetermined position of the machine to the position in which the part is mounted are ordered.

More specifically, when the machine 30 issues an alarm, the position order data acquisition unit 110 references the alarm part correspondence table 143 so as to identify a part number corresponding to the alarm, references the position order table 141 so as to identify a position order corresponding to the part number and references the position image correspondence table 142 so as to identify images corresponding to individual pieces of position information included in the position order.

The image data acquisition unit 111 acquires the front surface image data of the machine 30 serving as the home as the image data when the machine 30 is seen from the predetermined position, and acquires the image data of a surface (such as the right side surface, the left side surface or the back surface) where the position in which the part is mounted is present as image data when the machine 30 is seen from a separate position different from the predetermined position.

For example, when as in the UNIT01, the position in which the part is mounted is present on the side of the right side surface of the machine 30, the image data acquisition unit 111 acquires the right side surface image data of the machine 30. When as in the UNIT02, the position in which the part is mounted is present on the side of the left side surface of the machine 30, the image data acquisition unit 111 acquires the left side surface image data of the machine 30. When as in the UNIT03 to the UNIT05, the position in which the part is mounted is present on the side of the back surface of the machine 30, the image data acquisition unit 111 acquires the back surface image data of the machine 30.

The image conversion unit 112 produces one or more pieces of image data by converting the front surface image data (home) of the machine 30 serving as the image data when the machine 30 seen from the predetermined position according to the direction of the rotational movement with one or more aspect ratios.

Here, the direction of the rotational movement means the direction of rotation corresponding to a case where a user is guided from the predetermined position (the position in which the front surface of the machine 30 is seen, for example, the position in which the operation panel is seen) toward the surface of the machine 30 where the position in which the part is mounted is present.

More specifically, when the movement of the user from the predetermined position (for example, the position in which the front surface of the machine 30 is seen) toward the surface of the machine 30 where the position in which the part is mounted is present is guided, if the machine 30 seen from the user is seen such that, for example, a left/right direction (lateral) is shorter than an up/down direction (vertical), image data is produced in which the aspect ratio of the image data when the machine 30 is seen from the predetermined position is changed (changed such that the length of a lateral side is shorter than the length of a vertical side).

In this way, it is possible to produce an illusion for the user such that the user feels as if the user moved from the predetermined position toward the surface of the machine 30 where the position in which the part, is mounted is present. On the other hand, when the movement of the user from the predetermined position (for example, the position in which the front surface of the machine 30 is seen) toward the surface of the machine 30 where the position in which the part is mounted is present is guided, if the machine 30 seen from the user is seen such that, for example, the left/right direction (lateral) is longer than the up/down direction (vertical), image data is produced in which the aspect ratio of the image data when the machine 30 is seen from the predetermined position is changed (changed such that the length of the lateral side is longer than the length of the vertical side). The direction of the rotational movement for guiding the movement is not limited to these directions. The rotation in the up/down direction or an oblique direction may be performed (that is, the movement of the user may be guided toward the up/down direction or the oblique direction) according to the size, the shape and the like of the machine. When the predetermined position is set to the position in which the front surface of the machine 30 is seen, for example, in a case where the length of the width seen from the side surface of the machine 30 is shorter than the length of the width seen from the front surface of the machine 30, the aspect ratio of the front surface image data of the machine 30 is gradually changed so as to produce, for example, one or more pieces of image data in which the length in the lateral direction is shorter than the length in the vertical direction. In this case, in order to smooth the movement, it is preferable to produce a plurality of pieces of image data such that the length in the lateral direction is gradually reduced. The length in the lateral direction may be made equal to the length in the lateral direction when it is seen from the side surface of the machine 30.

On the other hand, when the predetermined position is set to the position in which the front surface of the machine 30 is seen, in a case where the length of the width seen from the side surface of the machine 30 is longer than the length of the width seen from the front surface of the machine 30, the aspect ratio of the front surface image data of the machine 30 is gradually changed so as to produce, for example, one or more pieces of image data in which the length in the lateral direction is longer than the length in the vertical direction. In order to describe the operation of the image conversion unit 112, an example of the image data generated by the image conversion unit 112 is shown in FIG. 5A.

FIG. 5A illustrates the image data generated when the length of the width seen from the side surface of the machine 30 is shorter than the length of the width seen from the front surface of the machine 30.

As shown in FIG. 5A, the image conversion unit 112 gradually changes the aspect ratio of the front surface image data of the machine 30 so as to generate one or more pieces of image data.

The guidance display control unit 113 displays, on the display unit 20, the front surface image data when the machine 30 is seen from the predetermined position (for example, the front surface), then sequentially displays the pieces of image data produced by gradually changing the aspect ratio of the front surface image data with the image conversion unit 112 and thereafter displays the image data of the surface (the right side surface, the left side surface or the back surface) where the position in which the part is mounted is present. In this way, by an optical illusion, the user can be made to feel that a movement from the front surface of the machine 30 to the surface (the right side surface, the left side surface or the back surface) where the position in which the part is mounted is present is guided. Then, the guidance display control unit 113 displays, on the display unit 20, the surface (the right side surface, the left side surface or the back surface) where the position in which the part is mounted is present, and thereafter displays, on the display unit 20, images corresponding to the individual pieces of position information included in the position order identified by the position order data acquisition unit 110.

FIG. 5B illustrates a case where images from the front surface image of the machine 30 to the position in which the UNIT05 is mounted are dynamically displayed.

With reference to FIG. 5B, the guidance display control unit 113 displays, on the display unit 20, the front surface image data, then sequentially displays the pieces of image data produced by gradually changing the aspect ratio of the front surface image data with the image conversion unit 112 and displays the back surface image.

In this way, by an optical illusion, the user can be made to feel that the movement from the front surface of the machine 30 to the surface (back surface) where the position in which the part is mounted is present is guided.

Thereafter, the guidance display control unit 113 displays the back surface BOX image and displays the BB2 image.

Although not illustrated, the same is true in the other cases.

For example, in the case of the UNIT01, the guidance display control unit 113 displays, on the display unit 20, the front surface image data, then sequentially displays the pieces of image data produced by gradually changing the aspect ratio of the front surface image data with the image conversion unit 112 and displays the right side surface image.

Thereafter, the guidance display control unit 113 displays the R1 image.

In the case of the UNIT02, the guidance display control unit 113 displays, on the display unit 20, the front surface image data, then sequentially displays the pieces of image data produced by gradually changing the aspect ratio of the front surface image data with the image conversion unit 112 and displays the left side surface image.

Thereafter, the guidance display control unit 113 displays the L1 image.

In the case of the UNIT03, the guidance display control unit 113 displays, on the display unit 20, the front surface image data, then sequentially displays the pieces of image data produced by gradually changing the aspect ratio of the front surface image data with the image conversion unit 112 and displays the back surface image.

Thereafter, the guidance display control unit 113 displays the BI1 image.

In the case of the UNIT04, the guidance display control unit 113 displays, on the display unit 20, the front surface image data, then sequentially displays the pieces of image data produced by gradually changing the aspect ratio of the front surface image data with the image conversion unit 112 and displays the back surface image.

Thereafter, the guidance display control unit 113 displays the back surface BOX image, and then displays the BB1 image.

In this way, it is not necessary to previously produce a video file or continuous drawings from the predetermined position (for example, the front surface) to the surface (the right side surface, the left side surface or the back surface) where the position in which the part is mounted is present, and thus it is possible to save special equipment and facilities for the production of the video file or the continuous drawings and furthermore, time.

The processing flow of the visual guidance device 10 will then be described.

FIG. 6 is a flowchart showing the operation of the visual guidance device 10.

With reference to FIG. 6, in step S11, when an alarm occurs (S11: yes), the processing is transferred to step S12.

When the alarm does not occur (S11: no), the processing is returned to step S11.

In step S12, the position order data acquisition unit 110 acquires the alarm part correspondence table 143 from the storage unit 14 and references the alarm part correspondence table 143 so as to identify a part number corresponding to the alarm.

In step S13, the position order data acquisition unit 110 references the position order table 141 in the storage unit 14 so as to identify a position order corresponding to the part number identified in step S12.

In step S14, the image data acquisition unit 111 acquires, from the storage unit 14, in the position order identified in the step S13, image data corresponding to the position of the "home" and image data corresponding to a surface where a position in which the part identified in step 312 is mounted is present (position 1).

In step S15, the image conversion unit 112 produces one or more pieces of image data by converting the image data corresponding to the position of the "home" according to the direction of the rotational movement with one or more aspect ratios.

In step S16, the guidance display control unit 113 displays, on the display unit 20, the image data corresponding to the position of the "home", then sequentially displays the one or more pieces of image data produced in step S15 and thereafter displays the image data of the surface where the position in which the part is mounted is present (position 1).

In step S17, the guidance display control unit 113 acquires, from the storage unit 14, pieces of image data corresponding to the "position 2" and the subsequent positions in the position order identified in step S13 and sequentially displays them on the display unit 20.

In the operation flow described above, when in steps S16 and S17, the guidance display control unit 113 sequentially displays the image data when the machine 30 is seen from the position of the "home", the one or more pieces of image data produced by the image conversion unit 112 and the image data indicating the position in which the part is mounted, still images with comments may be sequentially displayed on the display unit 20.

Alternatively, the guidance display control unit 113 may output sounds.

A specific operation of the visual guidance device 10 and the transition of a display screen when the alarm is "AL (3)" will then be described with reference to FIG. 5B.

When the alarm is the "AL (3)", the position order data acquisition unit 110 identifies, from the alarm part correspondence table 143, the fact that the alarm "AL (3)" corresponds to the part number "UNIT05".

Then, the position order data acquisition unit 110 identifies, from the position order table 141, the fact that the position order corresponding to the part number "UNIT05" is "home: front surface"→"position 1: back surface"→"position 2: back surface BOX"→"position 3: BB2".

Then, as shown in FIG. 5A, the image conversion unit 112 gradually changes the aspect ratio of the front surface image data of the machine 30 corresponding to the position of the "home" so as to generate one or more pieces of image data.

Then, as shown in FIG. 5B, the guidance display control unit 113 displays, on the display unit 20, the front surface image data, then sequentially displays the pieces of image data produced by gradually changing the aspect ratio of the front surface image data with the image conversion unit 112 and thereafter displays the image data of the surface where the position in which the part is mounted is present (the image data corresponding to the "position 1").

In this way, by an optical illusion, the user can be made to feel that a movement from the front surface of the machine 30 to the surface (the right side surface, the left side surface or the back surface) where the position in which the part is mounted is present is dynamically guided.

Then, the guidance display control unit 113 displays, on the display unit 20, the image data corresponding to the "position 1", and thereafter displays the image data (back surface BOX image) corresponding to the "position 2" and the image data (BB2 image) corresponding to the "position 3".

Although in the embodiment described above, when an alarm occurs in the machine 30, the visual guidance device 10 provides guidance for the position in which the part corresponding to the alarm is mounted, there is no limitation to this configuration.

For example, at the time of regular maintenance in a stage where no alarm occurs, when it is necessary to repair a part of the machine 30, a maintenance person inputs the part number of the part from the input unit 19 such that the visual guidance device 10 can guide, for the maintenance person, a movement from the position of the front surface to the position in which the part is mounted.

Effects of First Embodiment

In the present embodiment, the visual guidance device 10 sequentially displays, without previously producing continuous display drawings or a video file, pieces of image data automatically produced by gradually changing the aspect ratio of the image data of the machine 30 when the machine 30 is seen from a machine position where the operator constantly performs an operation and thereafter displays, for example, image data of a surface where a position in which a faulty part is mounted is present, with the result that the operator can feel that a movement from the front surface of the machine 30 to the surface where the position in which the faulty part is mounted is present is guided.

In this way, the operator of the machine 30 can easily recognize, from images corresponding to individual pieces of position information, the position in which the part is mounted.

When the machine 30 outputs an alarm, the visual guidance device 10 displays, on the display unit 20, based on the correspondence relationship between the alarm and the part acquired by referencing the alarm part correspondence table 143, images indicating one or more pieces of position information from an image indicating the predetermined position of the machine 30 to an image indicating a surface where the part corresponding to the alarm is mounted is present.

In this way, when a failure occurs in the machine 30, the operator of the machine 30 can easily recognize the position in which the faulty part is mounted.

The image data of the machine 30 when the machine 30 is seen from the predetermined position is an outline view when the machine 30 is seen from the point at which the operation panel of the machine 30 is seen.

In this way, the operator can identify the position in which the faulty part is mounted for a short period of time.

When the guidance display control unit 113 sequentially displays the pieces of image data, the guidance display control unit 113 can display them on the display unit 20 with comments or can output sounds.

In this way, the operator of the machine 30 can easily identify the position in which the part is mounted.

Second Embodiment

In the second embodiment of the present invention, the machine 30 of the first embodiment includes a visual guidance device 10 as a portion thereof.

The second embodiment of the present invention will be described below with reference to FIG. 7.

Figure 7:
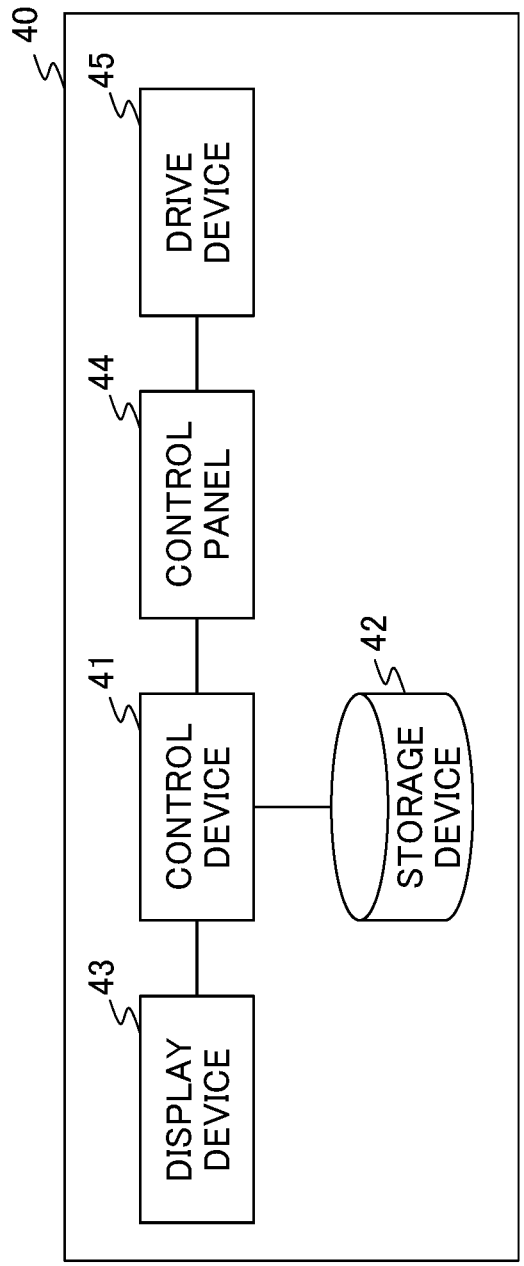
FIG. 7 is an overall configuration view of a machine including a visual guidance device according to a second embodiment of the present invention.

FIG. 7 is an overall configuration view of a machine 40 according to the second embodiment of the present invention. The machine 40 includes a control device 41, a storage device 42, a display device 43, a control panel 44 and a drive device 45.

The control device 41 includes, as portions thereof, as with the control unit 11 of the visual guidance device 10 according to the first embodiment, a position order data acquisition unit 110, an image data acquisition unit 111, an image conversion unit 112 and a guidance display control unit 113.

The control device 41 detects the alarm of the drive device 45. The control device 41 further includes general function blocks such as a function block for controlling the drive device 45, a function block for performing communication and a function block for receiving an operation from the user.

Since these general function blocks are well known by a person skilled in the art, the illustration and description thereof will be omitted.

The storage device 42 stores, as with the storage unit 14 of the visual guidance device 10 according to the first embodiment, a position order table 141, a position image correspondence table 142, an alarm part correspondence table 143 and an image file 144.

The display device 43 has the same function as the display unit 20 of the visual guidance device 10 according to the first embodiment.

Specifically, the display device 43 displays, by control from the guidance display control unit 113, images indicating one or more pieces of position information from an image indicating the predetermined position of the machine to an image of a surface of the machine 30 where a position in which a part is mounted is present.

The control panel 44 is a control panel that is used in order to electrically control the operation of the drive device 45 which will be described later, and may include an electromagnetic switch, an inverter, a servo driver, a servo amplifier, a selector switch, a sequencer and the like.

The drive device 45 is a device that is driven when the machine 40 performs an operation such as cutting or machining, and may include, for example, a spindle motor and a feed axis motor.

In the machine 40, when an alarm occurs while the operator is in the middle of performing the operation such as cutting or machining, the control device 41 identifies a part number corresponding to the alarm, uses position order data corresponding to the part number so as to sequentially display, on the display device 43, pieces of image data automatically produced by gradually changing the aspect ratio of the image data of the image indicating the predetermined position of the machine 40 and thereafter displays the image data of a surface where the position in which the part corresponding to the alarm is mounted is present. Thereafter, the control device 41 sequentially displays, on the display device 43, images up to the image indicating the position in which the faulty part is mounted.

Effects of Second Embodiment

In the present embodiment, the machine 40 itself has the same function as the visual guidance device 10 according to the first embodiment.

More specifically, the machine 40 includes the control device 41 which includes the same function as the control unit 11 of the visual guidance device 10, the storage device 42 which includes the same data as the storage unit 14 of the visual guidance device 10 and the display device 43 which has the same function as the display unit 20 of the visual guidance device 10.

In this way, when an alarm occurs while the machine 40 is being operated, the operator of the machine 40 performs

Third Embodiment

A third embodiment of the present invention will be described in detail below with reference to FIG. 8.

In the third embodiment, a system is provided where positions in which the parts of one or more machines 30 connected through a network to the visual guidance device 10 of the first embodiment are mounted are guided.

FIG. 8 is an overall configuration view of a visual guidance system 1A according to the present embodiment.

The same constituent elements of the visual guidance system 1 according to the first embodiment are identified with the same reference numerals, and the description of the functions thereof will be omitted.

The visual guidance system 1A includes a visual guidance device 10, machines 30A to 30N and a network 50.

In the visual guidance system 1A, when a failure occurs in any one of the machines 30A to 30N, the machine in which the failure occurs notifies an alarm to the visual guidance device 10 through the network 50.

When the visual guidance device 10 receives the alarm, the visual guidance device 10 references, from a storage unit 14, a position order table 141, a position image correspondence table 142, an alarm part correspondence table 143 and an image file 144 so as to acquire position order data.

Furthermore, by the same flow as the operation flow of FIG. 7 in the first embodiment, the visual guidance device 10 sequentially displays, on a display unit 20, images indicating one or more pieces of position information from an image indicating the predetermined position of the machine in which the failure occurs to an image indicating a position in which the faulty part is mounted.

The visual guidance device 10 described above is connected through the network to the machines 30A to 30N, and thus the visual guidance device 10 can be installed in a place separate from the machines 30A to 30N, for example, a service center or a call center.

In particular, in a factory monitoring system utilizing a network, the visual guidance system 1A is incorporated, in the service center of the factory monitoring system, the visual guidance device 10 is installed and thus when a failure occurs in a machine of the factory, it is not necessary to provide a field service person to the factory and it is possible to prepare the optimum part and rapidly provide the optimum field service person.

The visual guidance device 10 may function as a management device for centrally managing the machines 30A to 30N.

The storage unit 14 of the visual guidance device 10 may be installed on the network 50 as a storage device separate from the visual guidance device 10.

Effects of Third Embodiment

In the present embodiment, one visual guidance device 10 can guide positions in which the parts of one or more machines 30 are mounted.

In this way, an operator who manages the one or more machines 30 recognizes only the display unit 20 of the visual guidance device 10 and thereby can sequentially recognize pieces of position information from the predetermined positions of the one or more machines 30 to the mounted positions.

only an operation on the same machine and thereby can rapidly identify the position in which the faulty part is mounted.

[Variations]

Although the embodiments of the present invention are described above, the present invention is not limited to the embodiments described above.

The effects described in the present embodiments are simply a list of the most preferred effects produced from the present invention, and the effects of the present invention are not limited to the effects described in the present embodiments.

Although in the embodiments described above, one part corresponds to one alarm, there is no limitation to this configuration.

For example, a plurality of parts may correspond to one alarm, and thus the visual guidance device 10 may guide positions in which the parts are mounted.

Although in the embodiments described above, as the image data when the machine 30 is seen from the predetermined position, the front surface image data when the machine is seen from the point at which the operation panel of the machine 30 is seen is illustrated, there is no limitation to this configuration.

An arbitrary point may be set to the predetermined position. Although as the image data when the machine 30 is seen from a separate position different from the predetermined position, the image data indicating the surface where the position in which the part is mounted is present is illustrated, there is no limitation to this configuration.

For example, the image data of an arbitrary portion to which the movement of the user is desired to be guided may be used.

The whole of the visual guidance device 10 or a constituent element which is a portion thereof, for example, the control unit 11 may be installed on a network or may be installed as a virtual server on a cloud.

For example, the guidance display control unit 113 included in the visual guidance device 10 may be connected to the visual guidance device 10 so as to be able to communicate therewith.

A guidance method by the visual guidance system 1 or 1A is realized by software.

When it is realized by software, programs configuring the software are installed into one or more computers.

These programs may be recorded in removal media so as to be distributed to users or may be downloaded through a network to the computers of users so as to be distributed.

EXPLANATION OF REFERENCE NUMERALS 1, 1A visual guidance system
10 visual guidance device
11 control unit
110 position order data acquisition unit
111 image data acquisition unit
112 image conversion unit
113 guidance display control unit
14 storage unit
141 position order table
142 position image correspondence table
143 alarm part correspondence table
145 image file
19 input unit
20 display unit
30, 40 machine
41 control device
42 storage device
43 display device 44 control panel
45 drive device
50 network

What is claimed is:

1. A visual guidance device comprising a control unit, wherein the control unit includes:
    an image data acquisition unit which acquires image data when a machine is seen from a predetermined position and image data when the machine is seen from a separate position different from the predetermined position;
    an image conversion unit which produces one or more pieces of image data by converting gradually, with one or more aspect ratios, the image data when the machine is seen from the predetermined position that is acquired by the image data acquisition unit into image data when the machine is seen from a separate position different from the predetermined position; and
    a guidance display control unit which sequentially displays, on a display device, the image data when the machine is seen from the predetermined position, the one or more pieces of image data produced by the image conversion unit and the image data when the machine is seen from the separate position different from the predetermined position so as to guide a movement from the predetermined position to the separate position different from the predetermined position.

2. The visual guidance device according to claim 1, wherein the image data when the machine is seen from the separate position different from the predetermined position includes, for each of parts of the machine, image data indicating a position in which the part is mounted, and
    the guidance display control unit sequentially displays, on the display device, the image data when the machine is seen from the predetermined position, the one or more pieces of image data produced by the image conversion unit and the image data indicating the position in which the part is mounted so as to guide a movement from the predetermined position to the position in which the part is mounted.

3. The visual guidance device according to claim 2, wherein when the machine outputs an alarm, the guidance display control unit further sequentially displays, on the display device, based on a correspondence relationship between the alarm and the part, the image data when the machine is seen from the predetermined position, the one or more pieces of image data produced by the image conversion unit and image data indicating a position in which the part corresponding to the alarm is mounted so as to guide a movement from the predetermined position to the position in which the part corresponding to the alarm is mounted.

4. The visual guidance device according to claim 3, wherein when the guidance display control unit sequentially displays the image data when the machine is seen from the predetermined position, the one or more pieces of image data produced by the image conversion unit and the image data indicating the position in which the part corresponding to the alarm is mounted, the guidance display control unit performs the display with a comment on the display device.

5. The visual guidance device according to claim 3, wherein when the guidance display control unit sequentially displays the image data when the machine is seen from the predetermined position, the one or more pieces of image data produced by the image conversion unit and the image data indicating the position in which the part corresponding to the alarm is mounted, the guidance display control unit performs the display with a sound on the display device.

6. The visual guidance device according to claim 1, wherein the image data when the machine is seen from the predetermined position is an outline view when the machine is seen from a point at which an operation panel of the machine is seen.

7. The visual guidance device according to claim 1, wherein the image data acquisition unit acquires the image data from a storage device which stores the image data.

8. The visual guidance device according to claim 1, wherein the guidance display control unit is connected so as to be able to perform communication.

9. A machine comprising the visual guidance device according to claim 1.

10. A visual guidance system comprising one or more of the machines which are connected to the visual guidance device according to claim 1 so as to be able to communicate therewith.

11. A visual guidance method using one or more computers, the visual guidance method comprising:
    an image data acquisition step of acquiring image data when a machine is seen from a predetermined position and image data when the machine is seen from a separate position different from the predetermined position;
    an image conversion step of producing one or more pieces of image data by converting gradually, with one or more aspect ratios, the image data when the machine is seen from the predetermined position that is acquired by the image data acquisition step into image data when the machine is seen from a separate position different from the predetermined position; and
    a guidance display control step of sequentially displaying, on a display device, the image data when the machine is seen from the predetermined position, the one or more pieces of image data produced by the image conversion step and the image data when the machine is seen from the separate position different from the predetermined position so as to guide a movement from the predetermined position to the separate position different from the predetermined position.

* * * * *